(12) United States Patent
Poupart et al.

(10) Patent No.: US 10,494,052 B2
(45) Date of Patent: Dec. 3, 2019

(54) ADJUSTABLE-COMPRESSION SUSPENSION KIT FOR A WHEELED VEHICLE INCLUDING A HANDLEBAR

(71) Applicant: DECATHLON, Villeneuve d'Ascq (FR)

(72) Inventors: François Poupart, Luingne (BE); Gautier Destrebecq, Mazingarbe (FR); Alexandre Francois, Lille (FR); Rémi Lozach, Saint Andre Lez Lille (FR); Zigor Garate, Lezennes (FR)

(73) Assignee: DECATHLON, Villeneuve d'Ascq (FR)

( * ) Notice: Subject to any disclaimer, the term of this patent is extended or adjusted under 35 U.S.C. 154(b) by 0 days.

(21) Appl. No.: 16/077,491

(22) PCT Filed: Jan. 31, 2017

(86) PCT No.: PCT/FR2017/050213
§ 371 (c)(1),
(2) Date: Aug. 13, 2018

(87) PCT Pub. No.: WO2017/140965
PCT Pub. Date: Aug. 24, 2017

(65) Prior Publication Data
US 2019/0039678 A1    Feb. 7, 2019

(30) Foreign Application Priority Data

Feb. 15, 2016 (FR) ...................... 16 51185

(51) Int. Cl.
*B62K 23/04* (2006.01)
*B62K 25/08* (2006.01)
(Continued)

(52) U.S. Cl.
CPC .............. *B62K 23/04* (2013.01); *B62K 25/08* (2013.01); *B62K 25/30* (2013.01); *B62K 2025/048* (2013.01)

(58) Field of Classification Search
CPC .......... B62K 3/02; B62K 23/04; B62K 23/06; B62K 25/04; B62K 25/08; B62K 25/30;
(Continued)

(56) References Cited

U.S. PATENT DOCUMENTS

| 5,860,660 A | 1/1999 | Garcia |
| 7,806,022 B2 * | 10/2010 | Hara ..................... B62K 23/06 74/502.2 |

(Continued)

FOREIGN PATENT DOCUMENTS

| CN | 103661745 | 3/2014 |
| CN | 203567883 | 4/2014 |

(Continued)

OTHER PUBLICATIONS

Chinese search report in corresponding Chinese Application No. 2017800115187 dated Jul. 26, 2019 (2 pages).

*Primary Examiner* — Prasad V Gokhale
(74) *Attorney, Agent, or Firm* — Bookoff McAndrews, PLLC

(57) ABSTRACT

The invention relates to an adjustable-compression suspension kit for a wheeled vehicle, comprising a first suspension with adjustable compression (24), a second suspension with adjustable compression (26), an actuator device (32) for actuating the first and second suspensions, a first cable (34) connected to the actuator device and to the first suspension, a second cable (36) connected to the actuator device and to the second suspension; the actuator device (32) being configured to move the first cable (34) in a first direction while moving the second cable (36) in a second direction in order to increase compression of the first and second suspensions (24, 26). Characteristically, the actuator device is configured to move the first cable in the second direction while moving the second cable in the first direction, in order to reduce the compression of the first and second suspensions.

15 Claims, 6 Drawing Sheets

(51) Int. Cl.
  *B62K 25/30*   (2006.01)
  *B62K 25/04*   (2006.01)
(58) Field of Classification Search
  CPC ..... B62K 2025/048; B62L 3/02; B62L 3/023; B62L 3/026
  USPC .... 74/501.5 H, 502.2, 551.8, 551.9; 267/255
  See application file for complete search history.

(56)   References Cited

U.S. PATENT DOCUMENTS

2005/0252330 A1* 11/2005 Denk ................ B62K 23/02
                                                74/502.2
2009/0255768 A1* 10/2009 Inoue ................ B62K 25/08
                                                188/313
2016/0297501 A1* 10/2016 Fukao ................ B62M 25/04

FOREIGN PATENT DOCUMENTS

| CN | 103863495 | 6/2014 |
| CN | 105209734 | 12/2015 |
| EP | 1268266 | 4/2004 |
| JP | H04292288 A | 10/1992 |
| JP | 2014-208510 | 11/2014 |

* cited by examiner

ADJUSTABLE-COMPRESSION SUSPENSION KIT FOR A WHEELED VEHICLE INCLUDING A HANDLEBAR

BACKGROUND

The present disclosure relates to the field of vehicles, in particular wheeled vehicles and specifically cycles, e.g. bicycles.

More precisely, it relates to a suspension kit with adjustable compression for a vehicle, in particular a wheeled vehicle having at least one handlebar.

It is known that in order to adjust damping of a suspension it is generally necessary to perform three adjustments: preload, relaxation, and compression.

Adjusting the preload consists in adjusting the stiffness of the spring so as to raise the cycle.

Relaxation and compression are related to the hydraulics of the suspension. Relaxation and compression are adjusted by acting on valves for facilitating the passage of oil through the suspension to a greater or lesser extent.

Relaxation relates to damping when the cycle is moving up, and thus while the suspensions are relaxing, and compression relates to damping when the cycle is moving down, and thus when the suspensions are compressing.

The disclosure relates more particularly to adjusting the compression of suspensions.

Adjustable-compression suspension kits are known for a wheeled vehicle including a handlebar, such a suspension kit comprising:

- a first hydraulic suspension with adjustable compression including a first compression adjustment member configured to increase the compression of the first suspension when it is actuated in a first manner and to reduce the compression of the first suspension when it is actuated in a second manner, opposite to the first manner;
- a second hydraulic suspension with adjustable compression including a second compression adjustment member configured to increase the compression of the second suspension when it is actuated in a first manner and to reduce the compression of the second suspension when it is actuated in a second manner, opposite to the first manner;
- an actuator device for actuating the first and second suspensions, and presenting at least a first position and a second position that is distinct from the first position;
- a first cable portion having a first end connected to the actuator device and a second end connected to the first adjustment member; and
- a second cable portion having a first end connected to the actuator device and a second end connected to the second adjustment member.

Document US 2005/0252330 in particular describes such a suspension kit comprising a device for actuating front and rear suspensions of a bicycle, the device being fastened to the handlebar of said bicycle. That actuator device is connected to the front suspension of the bicycle by a first cable and to the rear suspension of the bicycle by a second cable. That actuator device further comprises a lever that, when it is put in a first position, serves to move both cables simultaneously in a common first direction. That simultaneous movement of both cables in the first direction increases the compression of both of the front and rear suspensions. Conversely, when the lever is brought into a second position, the actuator device moves both cables in a common second direction. That reduces the compression of both of the front and rear suspensions.

In contrast, it is necessary to apply considerable force to the lever of said actuator device so as to be able to move both cables simultaneously in the common direction, in particular in the first direction, and thus be able to increase the compression of both of the front and rear suspensions. A drawback of that type of device is that it becomes increasingly difficult to actuate after prolonged use.

In addition, in that known device, the cables connecting the front and rear suspensions to the actuator device slide in sheaths, so that friction appears between the cables and the sheaths. It should be understood that those constraints oblige the user to apply even more force on the lever in order to adjust the compression of the suspensions.

SUMMARY

An object of the present disclosure is to propose an adjustable-compression suspension kit for a wheeled vehicle having a handlebar, the kit overcoming the above-mentioned drawbacks and in particular serving to reduce the force that the user needs to apply in order to increase or reduce the compression of the first and second suspensions.

Embodiments of the disclosure achieve this aim by the fact that, when the actuator device is moved from said first position to said second position, said actuator device is configured to move the first cable portion in a first direction in order to actuate the first adjustment member in the first manner and to move the second cable portion in a second direction, opposite to the first direction, in order to actuate the second adjustment member in the first manner, in order to increase the compression of the first and of second suspensions, and when the actuator device is moved from said second position to said first position, said actuator device being configured to move the first cable portion in the second direction in order to actuate the first adjustment member in the second manner and to move the second cable portion in the first direction in order to actuate the second adjustment member in the second manner, in order to reduce the compression of the first and second suspensions.

Without going beyond the ambit of the disclosure, the vehicle could be a cycle such as a bicycle, or a motorized two-wheeled vehicle. Furthermore, the handlebar of the vehicle extends along an axis and may be provided with a grip handle making it possible for the user to manipulate the handlebar and thus steer the vehicle.

Contrary to suspensions configured in conventional manner, as used in the prior art, the suspension kit of the disclosure comprises a first suspension and a second suspension having first and second adjustment members with operation that is inverted.

Indeed, movement of the first cable portion in a first direction causes said first adjustment member to be actuated in the first manner. Preferably, movement of the first cable portion in the first direction causes a force to be exerted on the first adjustment member. In addition, movement of the second cable portion in a second direction, opposite to the first direction, serves to actuate the second adjustment member in the first manner. Preferably, but not exclusively, movement of the second cable portion in the second direction serves to actuate the second adjustment member in the first manner, and still preferably serves to move the second adjustment member in the first manner. Alternatively, movement of the second cable portion in the second direction moves the second adjustment member in the second manner.

The suspension kit of the disclosure thus enables the compression of the first and the second suspensions to be increased simultaneously.

Conversely, movement of the first cable portion in the second direction serves to actuate the first adjustment member of the first suspension in the second manner. Preferably, but not exclusively, movement of the first cable portion in the second direction serves to actuate the first adjustment member in the second manner, and still preferably serves to move the first adjustment member in the second manner. Alternatively, movement of the first cable portion in the second direction moves the first adjustment member in the second manner.

In addition, movement of the second cable portion in the first direction actuates the second adjustment member of the second suspension in the second manner. Preferably, movement of the second cable portion in the first direction causes a force to be exerted on the second adjustment member.

This causes the compression of the first and second suspensions to be reduced.

Also, the device functions in symmetrical manner, in the sense that, advantageously, the user exerts substantially the same force to increase compression as to reduce it.

Preferably but in non-limiting manner, the first adjustment member and the second adjustment member are actuated by moving said adjustment members. Still preferably, this movement may be a rotary movement or a movement in translation of said adjustment members.

In the first position of the actuator device, the first and second suspensions have low compression, they are then said to be softened and they serve to absorb the shocks to which the vehicle is subjected on uneven ground.

In the second position of the actuator device, the first and second suspensions have high compression, they are then said to be hardened and they serve to provide little absorption of the shocks to which the vehicle is subjected. This position is adapted to the vehicle moving on flat ground.

In an embodiment, the first and second cable portions constitute two distinct cables. In another embodiment, the first cable portion and the second cable portion constitute a single cable.

In advantageous manner, the first suspension includes a first return spring that tends to actuate the first adjustment member in the second manner, and the second suspension includes a second return spring that tends to actuate the second adjustment member in the first manner, and the actuator device is configured to pull the first cable portion in the first direction while simultaneously releasing the second cable portion when said actuator device is moved from said first position to said second position, and the actuator device is configured to release the first cable portion while simultaneously pulling the second cable portion in the first direction when said actuator device is moved from said second position to said first position.

The movement of the first cable portion, or of the second cable portion as the case may be, in said first direction thus corresponds to movement in a traction direction of the first cable portion, or of the second cable portion as the case may be, towards the actuator device. Also, passing from the first position to the second position, or passing from the second position to the first position respectively, leads to traction on the first cable portion, or on the second cable portion as the case may be.

In addition, movement of the first cable portion, or of the second cable portion as the case may be, in said second direction corresponds to movement in a release direction of the first cable portion, or of the second cable portion as the case may be; which release direction is opposite to the traction direction, and thus away from the actuator device.

During the assembly step, the suspension kit of the disclosure is advantageously configured so that when the first return spring is tensioned, the second return spring is brought substantially into the rest position. Conversely, when the second return spring is tensioned, the first return spring is brought substantially into the rest position.

When the actuator device passes from the first position to the second position, traction on the first cable portion leads to actuation of the first adjustment member in the first manner. This results in an increase in the compression of the first suspension. At the same time, the first return spring is tensioned.

In addition, the second cable portion is released and the second return spring, which is tensioned, exerts a return force on the second adjustment member, which leads to actuation of said member in the first manner. Compression of the second suspension then increases and the second return spring returns substantially to its rest position.

Similarly, when the actuator device passes from the second position to the first position, traction on the second cable portion leads to actuation of the second adjustment member, in the second manner. This results in the compression of the second suspension being reduced. In addition, the second return spring is tensioned.

In addition, the first cable portion is released and the first return spring, which is tensioned, exerts a return force on the first adjustment member, which leads to actuation of said member in the second manner. The compression of the first suspension is reduced and the first return spring then returns substantially to its rest position.

In particularly advantageous manner, when it is actuated in the first manner, the second adjustment member, subjected to the return force of the second spring, also exerts a return force on the second cable portion. This return force facilitates bringing the actuator device into the second position.

Similarly, when it is actuated in the second manner, the first adjustment member, subjected to the return force of the first spring, also exerts a return force on the first cable portion. This return force facilitates bringing the actuator device into the first position.

It should be observed that the devices of the prior art are configured so that it is necessary to pull on the two cable portions simultaneously in order to increase compression of the first and second suspensions. However, in that configuration, the first and second return springs both oppose the traction of the two cable portions and thus oppose actuation of the device. Actuating that type of device is thus very complicated.

The suspension kit of the disclosure thus facilitates actuating the actuator device and increasing or reducing the compression of the first and second suspensions. Compression of the first and second suspensions is thus increased or reduced by the user performing a single action, on both suspensions simultaneously, and without effort.

In non-limiting manner, the first suspension may be a front suspension arranged at the fork of the vehicle while the second suspension is a rear suspension of the vehicle acting as a shock absorber. Likewise, the first suspension may be a rear suspension of the vehicle while the second suspension is a front suspension of the vehicle.

Advantageously, the actuator device further includes a main body having a first end and a second end, said main body including a fastener sleeve for fastening the actuator device to the handlebar of the vehicle, which sleeve is arranged at the first end of the main body and extends along an axis.

The fastener sleeve serves to fasten the main body to the handlebar of the bicycle, in such a manner that the axis of the fastener sleeve coincides with the axis of the handlebar. In this way, the support is held stationary relative to the handlebar. Preferably, the main body is fastened to the handlebar in the vicinity of the grip handle, so that the actuator device also extends in the vicinity of the grip handle. In this manner, the user can actuate the first and second suspensions without releasing the handlebar or getting off the vehicle.

Preferably, the main body includes a guide portion for guiding the first and second cable portions and arranged at the second end of the main body.

The guide portion serves to guide entry of the first and second cable portions into the main body, so that these two cable portions extend in the main body. In a variant, the guide portion may be off-set radially from the axis of the handlebar.

In advantageous manner, the guide portion is configured so that the first cable portion and the second cable portion enter the main body in a direction that is substantially parallel to the axis of the fastener sleeve. It should thus be understood that the first and second cable portions enter the main body substantially parallel to the handlebar of the vehicle. An advantage is to make sure that the cable portions extend laterally and not towards the front of the vehicle, so as to reduce the space occupied by the device.

In non-restrictive manner, the first and second cable portions enter the main body substantially parallel to each other. Moreover, still in non-limiting manner, the guide portion extends in a direction away from the grip handle, so that the cable portions also extend in a direction away from the grip handle and so that they are not likely to get in the user's way when the user holds said grip handle.

Preferably, the actuator device includes control means, configured to move the first and second cable portions simultaneously. An advantage is to make it easy to move the actuator device from the first position to the second position, in order to increase compression of the first and second suspensions, or from the second position to the first position, in order to reduce the compression of the first and second suspensions. The control means serve to act quickly and simultaneously on both cable portions.

Preferably, the control means are actuated for increasing or reducing compression of the first and second suspensions by the user performing a single action.

In particularly advantageous manner, the control means are rotary. An advantage is to facilitate actuation of the control means while enabling the user to continue to hold the grip handle during actuation of said control means.

Preferably and in non-limiting manner, the control means are rotary about the handlebar axis and are arranged in the vicinity of the grip handle. In this configuration, it is easy for the user to act on the actuation means, e.g. with a thumb, while continuing to hold the grip handle with the fingers.

Advantageously, the control means further comprise a ring, and the main body includes a cylindrical portion, the ring being mounted to pivot on said cylindrical portion, said ring presenting at least a compression position and a release position, said compression position corresponding to said second position of the actuator device and said release position corresponding to said first position of the actuator device.

Preferably, in non-limiting manner, the cylindrical portion extends along the axis of the fastener sleeve, so that the ring pivots about the cylindrical portion about the axis of the fastener sleeve and thus about the axis of the handlebar of the vehicle. Said compression position and said release position of the ring correspond to two distinct angles of the ring, e.g. about the axis of the fastener sleeve.

Without going beyond the ambit of the present disclosure, the ring could take up additional positions. For example, the ring could present a blocking position corresponding to a third position of the actuator device, in which the actuator device is configured to move the first cable portion further in the first direction and to move the second cable portion further in the second direction, so as to further increase compression of the first and second suspensions, until they are blocked completely, and thus eliminate any shock-absorbing effect.

Provision could also be made for one or more intermediate positions between the first position and the second position, these intermediate positions corresponding to intermediate levels of compression of the suspensions.

In particularly advantageous manner, the first cable portion includes a first cable nipple and the second cable portion includes a second cable nipple, and the ring includes a first receiver portion for receiving the first cable nipple and a second receiver portion for receiving the second cable nipple.

In this way, turning said ring about the cylindrical portion of the main body, e.g. about the axis of the fastener sleeve, has the effect of modifying the positions of the first and second receiver portions. Also, when the ring is brought into its compression position, corresponding to the second position of the actuator device, the first receiver portion exerts a traction force on the first cable nipple of the first cable portion so that the first cable portion is pulled. At the same time, the attachment portion guides the second cable portion, which is thus released. Turning the ring about the cylindrical portion, so as to bring said ring into the compression position, thus serves to increase compression of the first and second suspensions simultaneously.

When the first and second return springs are present, the return force exerted on the second cable portion by the second adjustment member, itself subjected to the return force of the second return spring, creates additional torque on the ring. This torque reduces the force to be exerted on the ring in order to turn it and pull on the first cable portion. This configuration thus facilitates putting the actuator device into the second position, serving to increase compression of the first and second suspensions.

In similar manner, when the ring is brought into its release position, corresponding to the first position of the actuator device, the second receiver portion exerts a traction force on the second cable nipple of the second cable portion so that the second cable portion is pulled. At the same time, the first receiver portion guides the first cable portion, which is thus released.

In addition, the return force exerted on the first cable portion by the first adjustment member, itself subjected to the return force of the first return spring, also creates additional torque on the ring. This torque reduces the force to be exerted on the ring in order to turn it and pull on the second cable portion. This configuration thus facilitates putting the actuator device into the first position, serving to increase compression of the first and second suspensions.

Advantageously, the first and second receiver portions are angularly spaced apart by an angle of less than 180°, preferably substantially equal to 90°, by means of which the force that the first and second receiver portions exert, on the first and second cable nipples respectively, is increased. This reduces the force to be exerted on the ring in order to turn it and pull on the first cable portion or the second cable portion, when putting the actuator device into the first or second position.

Preferably and in non-limiting manner, the first and second receiver portions are configured to keep the first and second cable nipples facing each other, in such a manner that the first and second cable portions extend on both sides of the ring, along an outer peripheral wall of the ring.

In a variant embodiment, the first and second cable portions belong to a single cable and the ring includes an attachment portion for connecting said cable to said ring.

In this variant, the cable portions located on opposite sides of the attachment portion respectively constitute the first cable portion and the second cable portion in the above-described embodiment.

Also, in this variant, the operation of the actuator device is similar to that of the above-described embodiment. In particular, when the ring is brought into its compression position, the attachment portion exerts a traction force on the first cable portion, so that the first cable portion is pulled. At the same time, the second receiver portion guides the second cable portion, which is thus released. Turning of the ring about the cylindrical portion, so as to bring said ring into the compression position, thus serves to increase compression of the first and second suspensions simultaneously.

In similar manner, when the ring is brought from its release position, the attachment portion exerts a traction force on the second cable portion so that the second cable portion is pulled. At the same time, the attachment portion guides the first cable portion, which is thus released.

Without going beyond the ambit of the disclosure, the attachment portion can keep the cable connected to the ring by clamping.

Preferably, the cable is connected to the ring at substantially halfway along its length, thereby facilitating actuation of the cable and winding the cable around the ring.

In advantageous manner, the actuator device includes at least one holder element serving to hold the ring in said compression position or in said release position. An advantage is to prevent the ring from pivoting by accident about the cylindrical portion, which could lead to an untimely increase or reduction of the compression of the first and second suspensions.

In non-limiting manner, said at least one holder element is configured so as to provide resistance sufficient to hold the ring in said compression position or in said release position, but without preventing said ring from passing from one position to the other. In this way, a small force on the ring or on said at least one holder element serves to pass the ring from said compression position to said release position or vice versa.

Preferably, said at least one holder element includes a spring blade fastened to the outer peripheral wall of the ring and cooperating with at least first and second catches provided on an edge of the main body. It should be understood that when the spring blade cooperates with the first catch, the ring is held in its compression position, whereas when the spring blade cooperates with the second catch, the ring is held in its release position. The flexibility of the spring blade enables it to cooperate with both of the catches, and also to be released therefrom easily.

Preferably, said control means further include an actuator element comprising drive means that are configured to turn the ring. An advantage is to enable the user to turn the ring easily. Also preferably, the actuation element is a drive wheel extending annularly around the ring. The drive means serve to transmit to the ring torque that is exerted by the user on the drive wheel. In a variant, the drive means include a first series of catches provided on the drive wheel and for co-operating with a second series of catches provided on the ring, so as to turn the ring.

Preferably, the drive wheel is arranged along the axis of the handlebar in the proximity of the grip handle, in such a manner that the user can actuate said drive wheel without moving the hand, or releasing the grip handle. In addition, it should be understood that it is easy for the user to pivot the drive wheel about the axis of the fastener sleeve, by taking it between the thumb and index finger, while the other fingers continue to hold the grip handle.

Alternatively, the actuation element can be a lever.

The disclosure also provides a bicycle provided with the above-described adjustable-compression suspension kit.

BRIEF DESCRIPTION OF THE DRAWINGS

The disclosure can be better understood on reading the following description of an embodiment of the disclosure given by way of non-limiting example, with reference to the accompanying drawings, in which.

DETAILED DESCRIPTION

Figure 1:
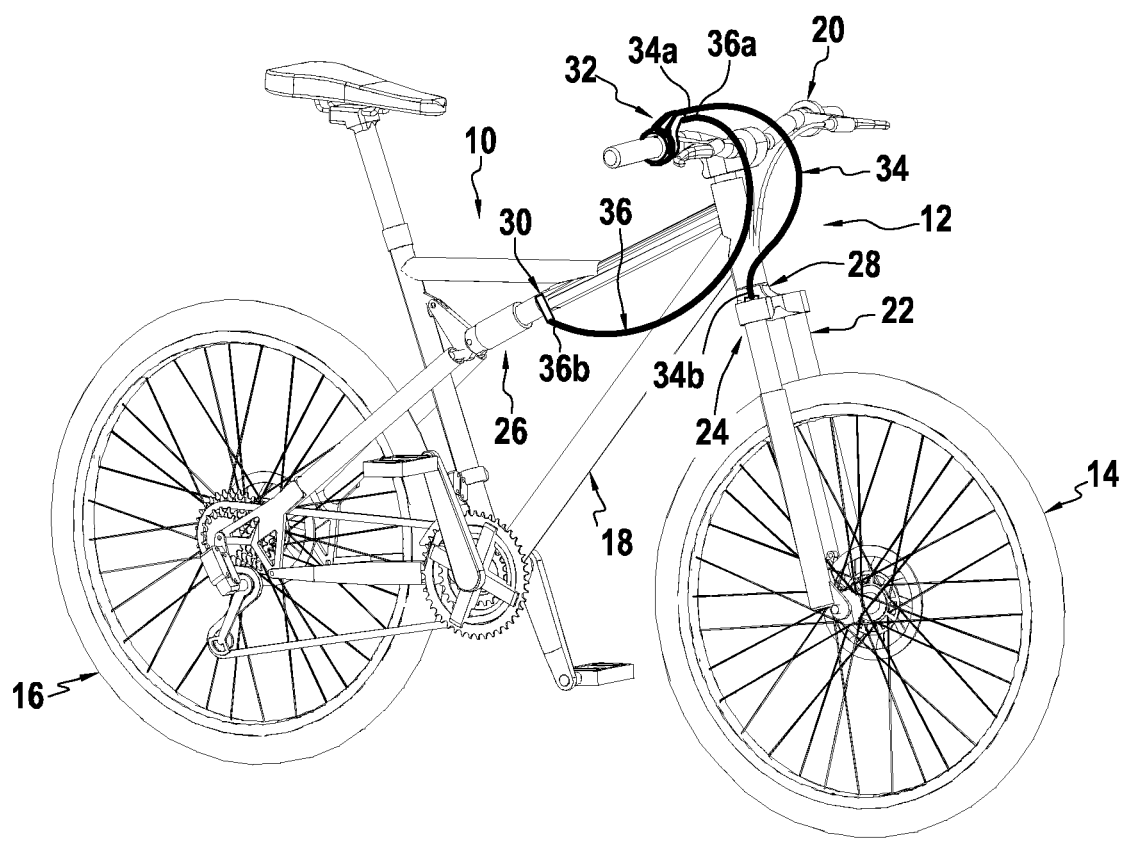
FIG. 1 shows a bicycle fitted with an example of an adjustable-compression suspension kit of the disclosure.

FIG. 1 shows a bicycle 10 provided with an adjustable-compression suspension kit 12 of the disclosure. In known manner, the bicycle 10 further comprises a front wheel 14, a rear wheel 16, a frame 18 and a handlebar 20 connected to the front wheel 14 by means of a fork 22. The adjustable-compression suspension kit 12 further comprises a first suspension 24 with adjustable compression arranged at the front of the bicycle 10, at the fork 22, and a second suspension 26 with adjustable compression arranged in part at the rear of the frame 18, such as a conventional bicycle shock absorber.

The first suspension 24 includes a first adjustment member 28 configured to increase the compression of the first suspension 24 when it is actuated in a first manner, in this example by being pulled, and to reduce the compression of the first suspension 24 when it is actuated in a second manner, e.g. by being released. When the compression of the first suspension 24 is high, it does not absorb many of the shocks to which the bicycle 10 is subjected, whereas when the compression of the first suspension 24 is low, that serves to absorb shocks to which the bicycle 10 is subjected.

The second suspension 26 includes a second adjustment member 30 configured to increase the compression of the second suspension 26 when it is actuated in a first manner, for example in the released state, and to reduce compression of the second suspension 26 when it is actuated in a second manner, e.g. by being pulled.

The first and second suspensions 24, 26 respectively include a first return spring 27 and a second return spring 29. The first and second return springs 27, 29 exert a return force F1, F2 on the first adjustment member 28 and on the second adjustment member 30 respectively.

In FIG. 1, it should be observed that the adjustable-compression suspension kit 12 also includes an actuator device 32 for actuating the first suspension 24 and the second suspension 26, said actuator device 32 being fastened to the handlebar 20 of the bicycle.

The adjustable-compression suspension kit 12 further includes a first cable 34 having its first end 34a connected to the actuator device 32 and having its second end 34b is connected to the first adjustment member 28 of the first suspension 24. In addition, the adjustable-compression suspension kit 12 includes a second cable 36 having its first end 36a connected to the actuator device 32 and its second end 36b connected to the second adjustment member 30 of the second suspension 26.

In non-limiting manner, the first end 34a of the first cable 34 and the first end 36a of the second cable 36 are provided with respective first and second cable nipples Ca, Cb that may be spherical or cylindrical.

The actuator device 32 presents a first position and a second position. When it is brought from the first position to the second position, said actuator device is in particular configured to pull on the first cable 34 in a first direction, in order to actuate, e.g. by pulling, the first adjustment member 28 of the first suspension 24 in the first manner, while simultaneously releasing the second cable 36, that then moves in a second direction, in order to actuate the second adjustment member 30 of the second suspension 26 in the first manner. It should be understood that this configuration in the second position of the actuator device 32 serves to increase compression of the first and second suspensions 24, 26 simultaneously.

Conversely, when it is brought from the second position to the first position, said actuator device 32 is in particular configured to release the first cable 34, which then moves in a second direction, in order to actuate the first adjustment member 28 of the first suspension 24 in the second manner, while simultaneously pulling the second cable 36, in the first direction, in order to actuate the second adjustment member 30 of the second suspension 26 in the second manner. It should be understood that this configuration in the first position of the actuator device 32 serves to reduce compression of the first and second suspensions simultaneously by the user performing a single action.

Figure 2:
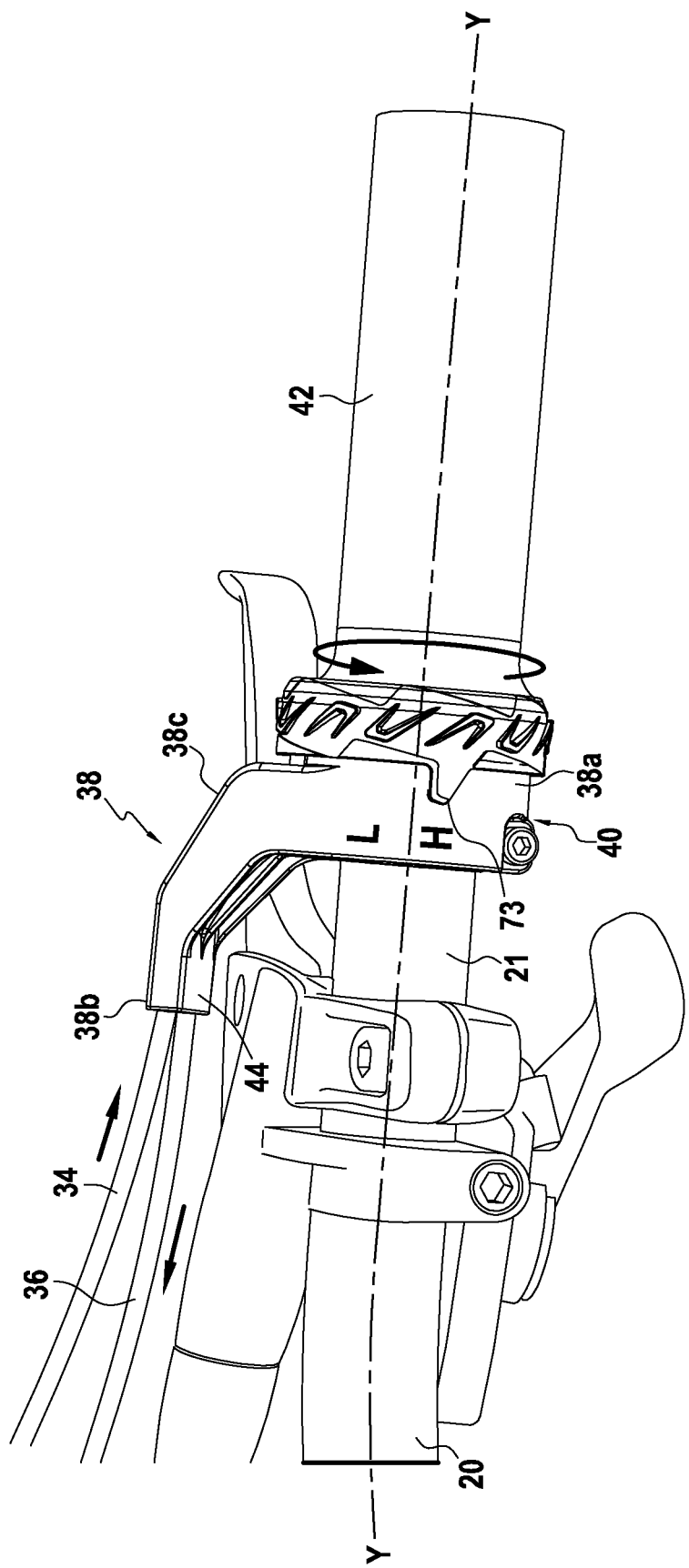
FIG. 2 shows an actuator device for actuating the adjustable-compression suspensions of the disclosure, fastened to the handlebar of a bicycle.

FIG. 2 shows an actuator device of the disclosure, fastened to a tube 21 of the handlebar 20 of the bicycle 10, said tube having an axis Y. The actuator device 20 further comprises a main body 38 that presents a first 38a end, a second end 38b remote from the first end 38a, and a bend portion 38c.

The bend portion 38c of the main body is situated between the first end 38a and the second end 38b of the main body 38. The first end 38a of the main body 38 is provided with a fastener sleeve 40 serving to fasten the actuator device to the tube 21 of the handlebar 20.

Figure 3:
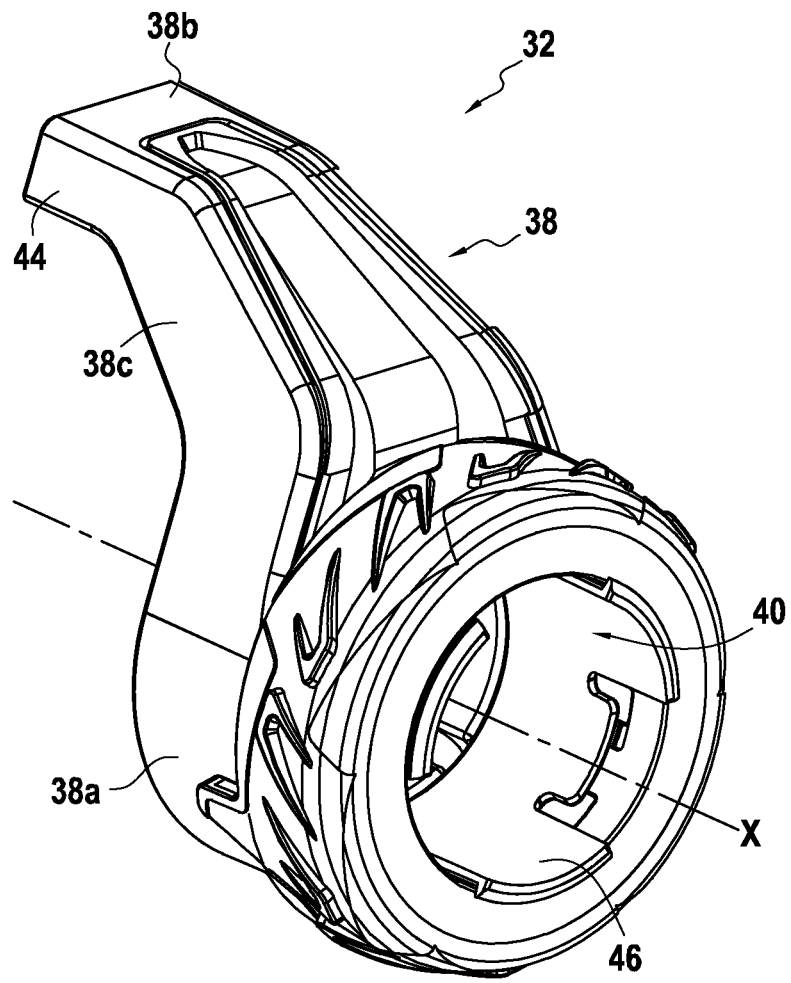
FIG. 3 is a perspective view of the actuator device of FIG. 2.

As can be seen in FIG. 3, the fastener sleeve 40 presents the general shape of a cylinder of axis X. The fastener sleeve 40 is designed to clamp onto the tube 21 of the handlebar 20 of the bicycle, in such a manner that the axis X of the fastener sleeve 40 coincides with the axis Y of the tube 21 of the handlebar 20.

Again with reference to FIG. 2, it should be observed that, in non-limiting manner, the tube 21 of the handlebar 20 is provided with a grip handle 42 extending along a longitudinal axis that also coincides with the axis Y of the tube 21 of the handlebar 20. The grip handle 42 is arranged in the vicinity of the actuator device 32 in such a manner that the user does not need to move the hand or release the grip handle 42 in order to act on the actuator device 32.

The main body 38 includes a guide portion 44 for guiding the first and second cables 34, 36, arranged at the second end 38b of the main body. The first and second cables 34, 36 enter the main body 38, substantially parallel to each other, via the guide portion 44. Furthermore, the guide portion 44 is off-set radially from the axis X of the fastener sleeve 40 and is configured so that the first and second cables 34, 36 enter the main body along a direction that is substantially parallel to the axis X of the fastener sleeve 40. It should be understood that the first and second cables extend laterally, substantially parallel to the handlebar 20 of the bicycle, so as to reduce the space occupied by the actuator device 32.

In addition, the guide portion 44 extends in a direction going away from the grip handle 42. Thus, the first and second cables 34, 36 are not likely to get in the user's way while the user is holding the grip handle 42.

The main body 38 further includes a cylindrical portion 46 projecting along the axis X of the fastener sleeve, in a direction opposite to the direction in which the guide portion 44 extends from the main body 38 (see FIG. 3). The main body further includes a substantially circular edge 47, projecting along the axis X of the fastener sleeve 40, extending said fastener sleeve, substantially about the cylindrical portion 46.

Figure 4:
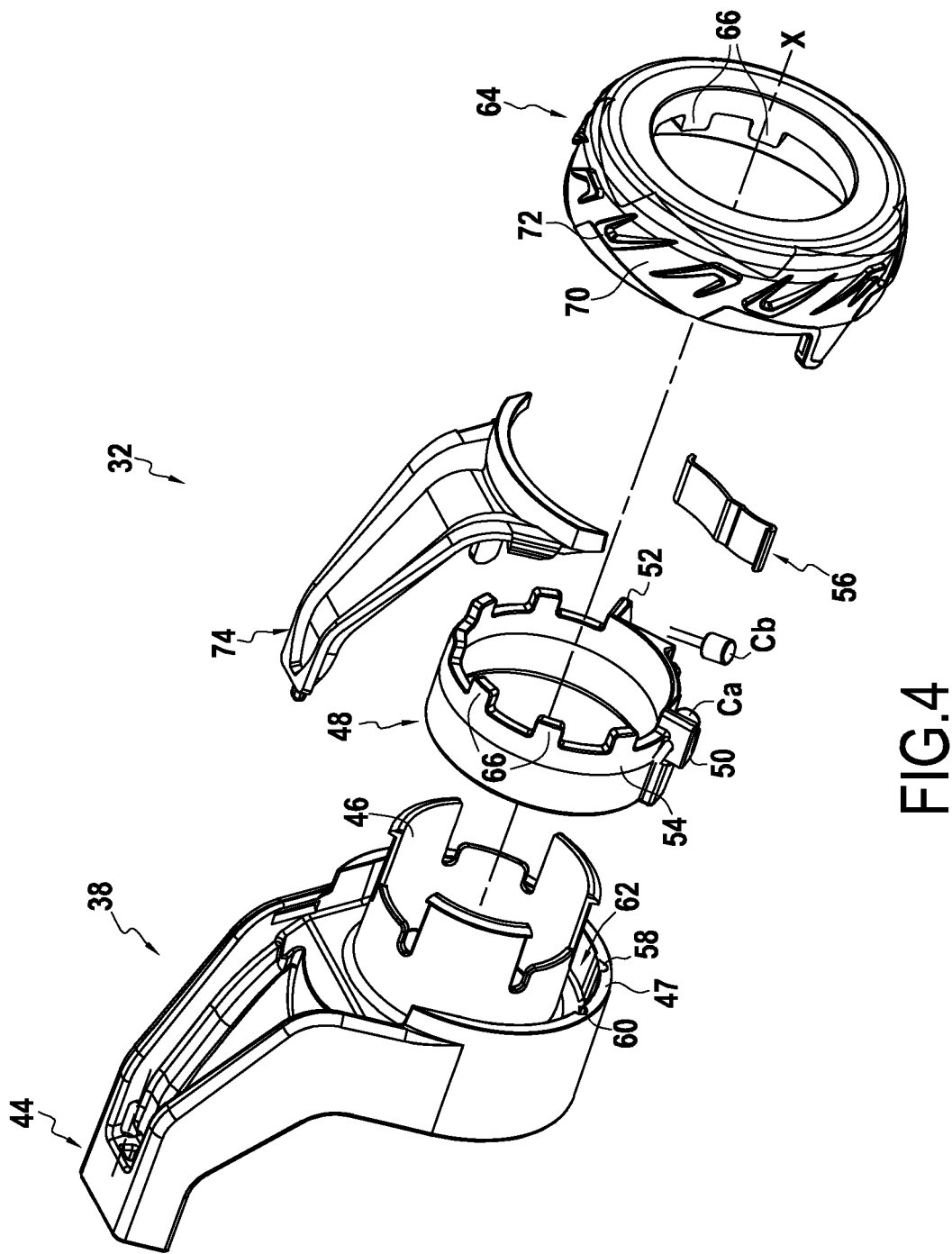
FIG. 4 is an exploded view of the actuator device of FIG. 3.
Figures 7A, 7B, 8:
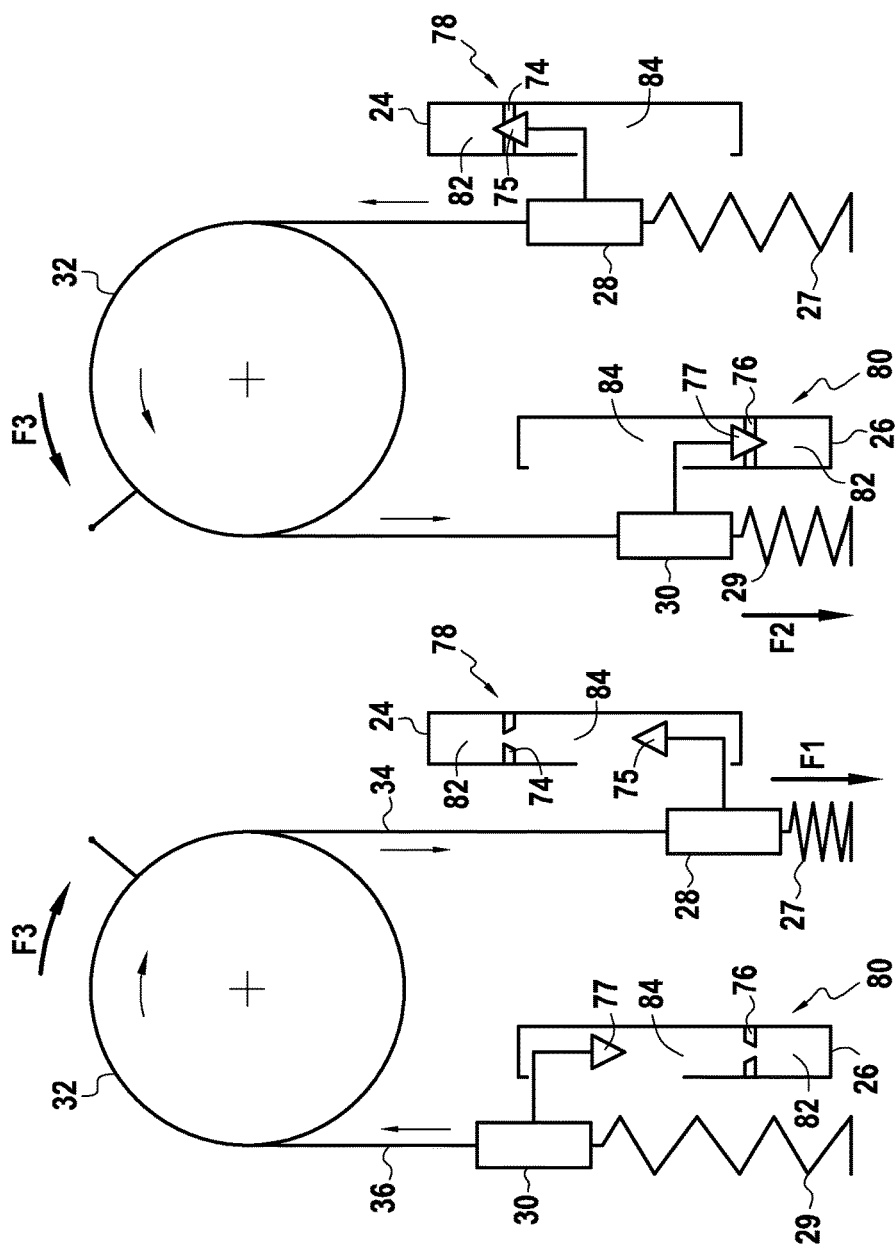
FIG. 7A is a kinetic diagram of the suspension kit of the disclosure, with the actuator device in the first position.
FIG. 7B is a kinetic diagram of the suspension kit of the disclosure, with the actuator device in the second position.
FIG. 8 shows a second embodiment of the actuator device.

As can be seen in FIG. 4, the actuator device 32 further includes a ring 48 mounted to pivot about the cylindrical portion 46 of the main body 38. In this non-limiting example, the ring 48 pivots annularly about the cylindrical portion 46 and presents a compression position and a release position. The compression position corresponds to the second position of the actuator device, in which the compression of the suspensions is high. The release position corresponds to the first position of the actuator device, in which the compression of the suspensions is low. Without going beyond the ambit of the disclosure, the ring 48 could take up additional positions, as shown in the variant of FIG. 8.

The ring 48 includes a first receiver portion 50 for the first cable nipple Ca of the first cable 34 and a second receiver portion 52 for the second cable nipple Cb of the second cable 36.

Figure 6:
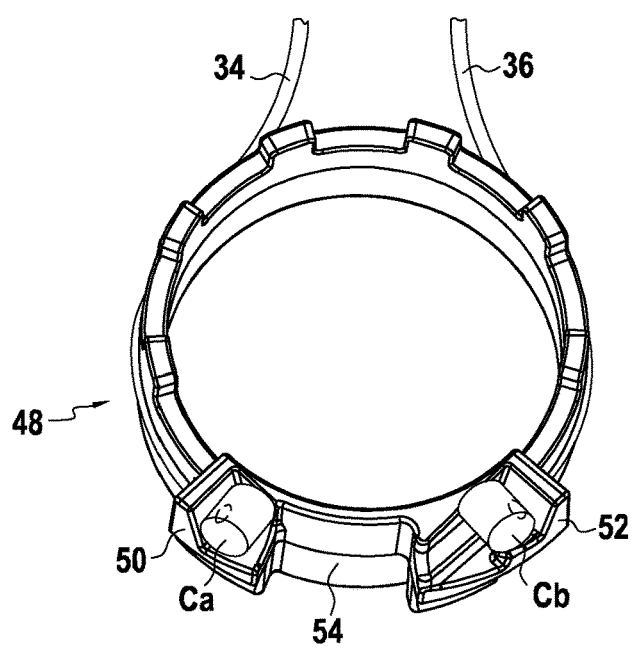
FIG. 6 shows the ring of FIG. 4.

As can be seen in FIG. 6, the first receiver portion 50 and the second receiver portion 52 extend radially from an outer peripheral wall 54 of the ring 48, in such a manner as to constitute first and second passages serving to hold the first cable nipple Ca and the second cable nipple Cb tangentially to ring 48. In particular, the first receiver portion 50 and the second receiver portion 52 are configured to hold the first cable nipple Ca and the second cable nipple Cb substantially facing each other, so that the first and second cables 34, 36 extend on either side of the ring 48, running along its outer peripheral wall 54.

The first receiver portion 50 and the second receiver portion 52 are angularly spaced apart by an angle that is substantially equal to 90°.

Figure 5:
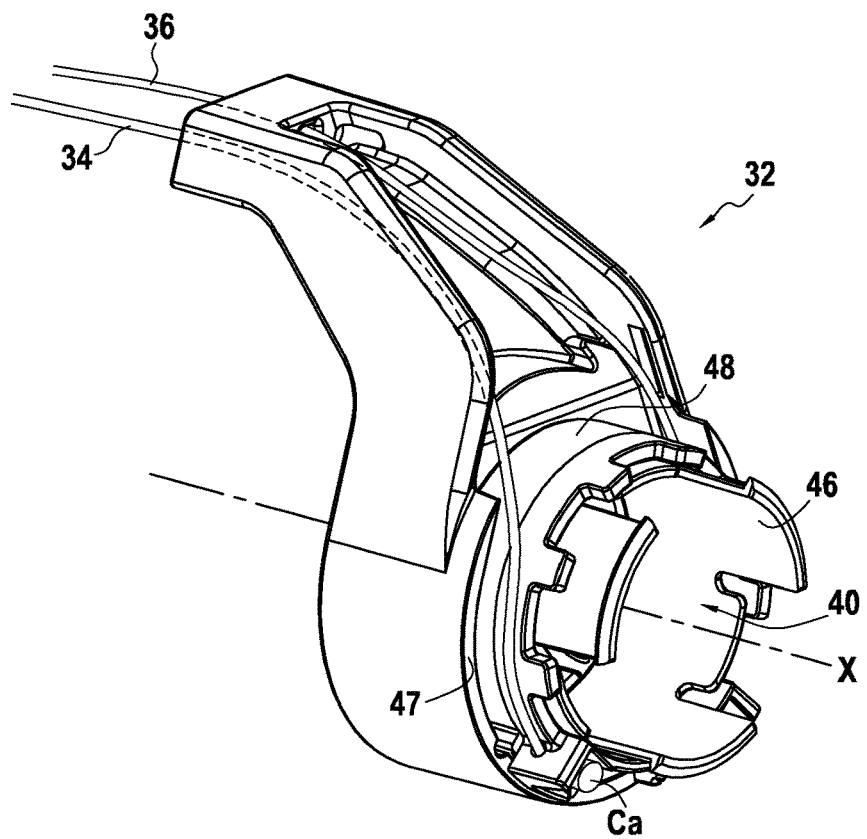
FIG. 5 shows the main body, provided with a cable, as well as the ring of FIG. 4.

With reference to FIG. 5, it should be observed that the first and second cables 34, 36 enter the main body 38 via the guide portion 44, that they pass through the main body along the bend portion 38c, and that they extend on either side of the ring 48 in the above-described configuration.

The actuator device also includes a spring blade 56 fastened to the outer peripheral wall 54 of the ring 48 and configured to cooperate with a first catch 58 or with a second catch 60 provided on an inside wall 62 of the edge 47 of the main body 38.

In addition the actuator device 32 includes a drive wheel 64 configured to extend annularly around the ring 48 about the axis X of the fastener sleeve 40. The drive wheel 64 includes a first series of catches 66 for co-operating with a second series of catches 68 provided on the ring, so as to turn the ring 48. The first series and second series of catches 66, 68 thus constitute means for turning the ring.

Preferably, the drive wheel 64 is arranged in the vicinity of the grip handle 42 in such a manner that the user can actuate said drive wheel 64 without moving the hand, or releasing the grip handle 42. In addition, it should be understood that it is easy for the user to pivot the drive wheel 64 about the axis Y of the tube 21 of the handlebar 20, by holding it between the thumb and index finger, while the other fingers continue to hold the grip handle 42.

Furthermore, an outer peripheral wall 70 of the drive wheel 64 is provided with ridge elements 72 making said drive wheel easier to handle. The drive wheel also includes an indicator portion 73 projecting substantially parallel to the axis X of the fastener sleeve 40, from the outer peripheral wall 70 of the drive wheel 64. The indicator portion 73 serves to inform the user about the current state of the first and second suspensions 24, 26.

In non-limiting manner, the actuator device 32 further includes a cover 74 serving to close the bend portion 38c and thus to facilitate guidance of the first and second cables 34, 36 in the main body 38.

In the second position of the actuator device 32, the ring 48 is arranged in the compression position, in which the spring blade 56 cooperates with the first catches 58 of the edge 47 of the main body 38. In this position, the ring is positioned so that the first cable 34 is pulled in the first direction, while the second cable 36 is released. In this way, the compression of the first and second suspensions 24, 26 is increased. In addition, the indicator portion 73 is arranged facing an indicator H (for High) arranged on the outer wall of the fastener sleeve 40, thus indicating to the user that compression of the first and second suspensions 24, 26 is high.

As can be seen in FIG. 2, in order to pass from this second position of the actuator device 32 to the first position of the actuator device, the user actuates the drive wheel 64 by applying torque thereto. The ring is then turned by said drive wheel 64 by the first series of catches 68 co-operating with the second series of catches 70. The ring 48 thus pivots about the axis X of the fastener sleeve 40 and thus also about the cylindrical portion 46 around the axis of the tube 21 of the handlebar 20, clockwise in this example. This turning of the ring 48 results in applying a force tangential to the outer peripheral wall 54 of the ring on the first and second cables 34, 36, in the direction in which the ring is turned. This enables the ring to release the first cable 34 while simultaneously pulling the second cable 36 in the first direction, said two cables sliding in the main body. It follows that the compression of the first and second suspensions 24, 26 is simultaneously reduced, following a single actuation of the drive wheel 64.

In addition, it should be understood that the ring 48 pivots about the axis X of the fastener sleeve 40 until the spring blade 56 cooperates with the second catch 60 of the edge 47 of the main body 38, then serving to hold the ring in the release position, corresponding to the first position of the actuator device 32.

It should also be understood that the angular stroke of the ring 48 between the compression position and the release position, and thus between the second position and the first position of the actuator device 32, is a function of the angular distance between the first and second catches 58, 60. Preferably, the angular stroke of the ring 48 about the axis X of the fastener sleeve 40, between the first position and the second position is substantially 70°. In this example of passing from the second position to the first position of the actuator device 32, the force that the first return spring exerts on the first cable 34 creates, on the ring 48, additional torque that is added to the torque exerted by the user on the drive wheel 64. This reduces the force F3 that the user needs to exert in order to turn the ring and to pull on the second cable 36. This thus facilitates passing the actuator device from its second position to its first position, serving to reduce compression of the first and second suspensions 24, 26. In addition, in the first position of the actuator device 32, the indicator portion 73 is arranged facing an indicator L (for Low) arranged on the outer wall of the fastener sleeve 40, thus indicating to the user that compression of the first and second suspensions 24, 26 is low.

The operation of the suspension kit of the disclosure can be better understood from FIGS. 7A and 7B, which are in the form of kinematic diagrams in which the first and second adjustment members 28 and 30 are arranged inversely and comprise respective first and second shutter portions 75, 77, having substantially triangular cross sections. Both suspensions 24, 26 are shown in the form of a first piston 74 and a second piston 76 arranged within a first cylinder 78 and a second cylinder 80. Each of the first and second pistons 74, 76 includes a respective central opening allowing a fluid, such as oil, to pass from a first chamber 82 to a second chamber 84 in each of the first and second cylinders 78, 80.

In FIG. 7A, it should be observed that the actuator device 32 is brought from the second position to the first position, causing the drive wheel 64 to pivot, in such a manner as to turn the ring 48 clockwise. When being brought into this first position, the actuator device 32 pulls on the second cable 36, in the first direction. This traction on the second cable leads to the second adjustment member 30 being actuated in the second manner, in this example by traction. In addition, the second return spring 29 is tensioned. In parallel, the first cable portion 34 is released in the second direction and the first return spring 27, which is initially tensioned, exerts a return force F1 on the first adjustment member 28, which leads to said member being actuated in the second manner. The first return spring 27 then returns substantially to its rest position.

The first and second shutter portions 75, 77 of the first and second adjustment members do not shut the openings in the first and second pistons 74, 76, in such a manner that compression of the first and second suspensions 24, 26 is reduced and the shock-absorbing effect continues to operate.

In addition, according to a particularly advantageous aspect of the disclosure, the first adjustment member 28 subjected to return force F1, exerted by the first return spring 27, also exerts a return force on the first cable 34. This return force on the first cable 34 creates additional torque on the ring 48, facilitating putting the actuator device into the first position.

In particular, the return forces F1 and F2 that the first and second return springs 27, 29 exert on the first and second adjustment members 28, 30 respectively, are substantially equal, so that these two forces compensate each other and balance each other out.

In this way, the force F3 that needs to be applied to the actuator device 32, and in particular the force that needs to be applied to the drive wheel 64 so as to place said actuator device 32 in the first position, is greatly reduced.

By analogy, the behavior is similar when the actuator device 32 is brought from the first position towards the second position. The user then causes the drive wheel 64 to pivot counterclockwise, which turns the ring 48 counterclockwise and pulls the first cable 34 in the first direction, while simultaneously releasing the second cable 36, which then moves in the second direction in such a manner as to increase compression of the first and second suspensions 24, 26. FIG. 7B shows the actuator device 32 being put into the second position. Traction on the first cable 34 leads to the first adjustment member 28 being actuated in the first manner, in this example by traction. At the same time, the first return spring is tensioned. In parallel, the second cable portion 36 is released and the second return spring 29, which is initially tensioned, exerts a return force on the second adjustment member 30, which leads to said member being actuated in the first manner. The second return spring 29 then returns substantially to its rest position.

The first and second shutter portions 75, 77 of the first and second adjustment members 28, 30 do shut the openings in the first and second pistons 74, 76, in such a manner that the fluid can no longer pass from the first chamber 82 to the second chamber 84. Compression of the first and second suspensions 24, 26 is increased and the shock-absorbing effect is limited. Again in this example, the second adjustment member 30 subjected to the return force F2, exerted by the second return spring 29, also exerts return force on the second cable 36. This return force on the second cable 36 creates additional torque on the ring 48, facilitating putting the actuator device 32 into the second position.

Moreover, the forces F1, F2 exerted by the first and second return springs 27, 29 on the first and second adjustment members 28, 30, compensate each other. Putting the actuator device 32 into the second position is thus also facilitated.

The suspension kit 12 of the disclosure thus facilitates actuation of the actuator device 32 and the increase or reduction in compression of the first and second suspensions 24, 26.

FIG. 8 shows a variant of the main body 38 of the actuator device 32 of the disclosure, allowing the actuator device to take up a third position. In this example, the first position of the actuator device 32 corresponds to low compression of the first and second suspensions 24, 26, the second position of the actuator device corresponds to high compression of the suspensions, while the third position corresponds to the suspensions being in a blocked state.

In this variant, the main body 38 of the actuator device 32 includes a third catch 59 provided, like the first and second catches 58, 60, on the inside wall 62 of the edge 47 of the main body 38. The third catch is arranged so that the distance between the first and second catches 58, 60 is substantially identical to the distance between the second and third catches 60, 59. The ring 48 pivots about the axis X of the fastener sleeve 40 until the spring blade 56 co-operates with the third catch 59. In this position, the ring pulls further on the first cable 34, in the first direction, and further releases the second cable 36, in the second direction, so that the compression of the suspensions 24, 26 is increased up to a level of compression at which the shock-absorbing effect performed by the suspensions is substantially zero, so that the first and second suspensions 24, 26 are considered to be blocked.

Even though some features, concepts or aspects of the embodiments may be described herein as being a preferred (more or less) arrangement or method, or an advantageous arrangement or method, such description is not intended to suggest that such feature or features are required or necessary unless expressly so stated.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

The invention claimed is:

1. An adjustable-compression suspension kit for a wheeled vehicle including a handlebar, said suspension kit comprising:
   a first hydraulic suspension with adjustable compression including a first compression adjustment member configured to increase the compression of the first suspension when it is actuated in a first manner and to reduce the compression of the first suspension when it is actuated in a second manner, opposite to the first manner;
   a second hydraulic suspension with adjustable compression including a second compression adjustment member configured to increase the compression of the second suspension when it is actuated in a first manner and to reduce compression of the second suspension when it is actuated in a second manner, opposite to the first manner;
   an actuator device for actuating the first and second suspensions, and presenting at least a first position and a second position that is distinct from the first position;
   a first cable portion having a first end connected to the actuator device and a second end connected to the first compression adjustment member; and
   a second cable portion having a first end connected to the actuator device and a second end connected to the second compression adjustment member;
   wherein, when the actuator device is moved from said first position to said second position, said actuator device is configured to move the first cable portion in a first direction in order to actuate the first compression adjustment member in the first manner and to move the second cable portion in a second direction, opposite to the first direction, in order to actuate the second compression adjustment member in the first manner, in order to increase the compression of the first and second suspensions, and when the actuator device is moved from said second position to said first position, said actuator device being configured to move the first cable portion in the second direction in order to actuate the first compression adjustment member in the second manner and to move the second cable portion in the first direction in order to actuate the second compression adjustment member in the second manner, in order to reduce the compression of the first suspension and second suspensions.

2. The kit according to claim 1, wherein the first suspension includes a first return spring that tends to actuate the first compression adjustment member in the second manner, wherein the second suspension includes a second return spring that tends to actuate the second compression adjustment member in the first manner, and wherein the actuator device is configured to pull the first cable portion in the first direction while simultaneously releasing the second cable portion when said actuator device is moved from said first position to said second position, and wherein the actuator device is configured to release the first cable portion while simultaneously pulling the second cable portion in the first direction when said actuator device is moved from said second position to said first position.

3. The kit according to claim 1, wherein the actuator device further includes a main body having a first end and a second end, said main body including a fastener sleeve for fastening the actuator device to the handlebar of the vehicle, which sleeve is arranged at the first end of the main body and extends along an axis.

4. The kit according to claim 3, wherein the main body includes a guide portion for guiding the first and second cable portions and arranged at the second end of the main body.

5. The kit according to claim 4, wherein the guide portion is configured so that the first cable portion and the second cable portion enter the main body in a direction that is substantially parallel to the axis of the fastener sleeve.

6. The kit according to claim 1, wherein the actuator device includes a control device, configured to move the first and second cable portions simultaneously.

7. The kit according to claim 6, wherein the control device is rotary.

8. The kit according to claim 6, wherein the actuator device further includes a main body having a first end and a second end, said main body including a fastener sleeve for fastening the actuator device to the handlebar of the vehicle, which sleeve is arranged at the first end of the main body and extends along an axis, and wherein the control device further comprises a ring, and wherein the main body includes a cylindrical portion, the ring being mounted to pivot on said cylindrical portion, said ring presenting at least a compression position and a release position, said compression position corresponding to said second position of the actuator device and said release position corresponding to said first position of the actuator device.

9. The kit according to claim 8, wherein the first cable portion includes a first cable nipple and the second cable portion includes a second cable nipple, and wherein the ring includes a first receiver portion for receiving the first cable nipple and a second receiver portion for receiving the second cable nipple.

10. The kit according to claim 9, wherein the first and second receiver portions are angularly spaced apart by an angle of less than 180°.

11. The kit according to claim 10, wherein the first and second receiver portions are angularly spaced apart by an angle that is substantially equal to 90°.

12. The kit according to claim 8, wherein the actuator device includes at least one holder element serving to hold the ring in said compression position or in said release position.

13. The kit according to claim 8, wherein said control device further includes an actuator element comprising a drive device that is configured to turn the ring.

14. The kit according to claim 13, wherein the actuator element is a drive wheel extending annularly about the ring.

15. A bicycle provided with an adjustable-compression suspension kit according to claim 1.

* * * * *